US011459641B2

United States Patent
Ratchev et al.

(10) Patent No.: US 11,459,641 B2
(45) Date of Patent: Oct. 4, 2022

(54) HIGHLY RIGID SHEET FOR CAR BODY

(71) Applicant: CONSTELLIUM NEUF-BRISACH, Biesheim (FR)

(72) Inventors: Petar Ratchev, Voiron (FR); Jean-Philippe Masse, Grenoble (FR); Christophe Chabriol, Champier (FR); Ravi Shahani, Voreppe (FR); Lukasz Dolega, Grenoble (FR)

(73) Assignee: CONSTELLIUM NEUF-BRISACH, Biesheim (FR)

( * ) Notice: Subject to any disclaimer, the term of this patent is extended or adjusted under 35 U.S.C. 154(b) by 690 days.

(21) Appl. No.: 15/780,463

(22) PCT Filed: Nov. 7, 2016

(86) PCT No.: PCT/FR2016/052878
§ 371 (c)(1),
(2) Date: May 31, 2018

(87) PCT Pub. No.: WO2017/093627
PCT Pub. Date: Jun. 8, 2017

(65) Prior Publication Data
US 2018/0347016 A1 Dec. 6, 2018

(30) Foreign Application Priority Data

Dec. 1, 2015 (FR) ........................................ 1561647
Jun. 15, 2016 (FR) ........................................ 1655564

(51) Int. Cl.
*C22C 21/04* (2006.01)
*C22F 1/043* (2006.01)
(Continued)

(52) U.S. Cl.
CPC ............ *C22C 21/04* (2013.01); *B62D 29/008* (2013.01); *C22C 21/02* (2013.01); *C22F 1/043* (2013.01)

(58) Field of Classification Search
CPC ....... C22C 21/04; C22C 21/02; B62D 29/008; C22F 1/043
(Continued)

(56) References Cited

U.S. PATENT DOCUMENTS 4,126,486 A    11/1978   Morris et al.
5,837,070 A * 11/1998   Sainfort .................. C22C 21/04
                                                                                            148/552
(Continued)

FOREIGN PATENT DOCUMENTS

CN    102899539 A    1/2013
CN    104372210 A    2/2015
(Continued)

OTHER PUBLICATIONS

Aluminum-Silicon Alloys, Key to Metals AG (Year: 2003).*
(Continued)

*Primary Examiner* — Brian D Walck
*Assistant Examiner* — D. M. C.
(74) *Attorney, Agent, or Firm* — McBee Moore & Vanik IP, LLC (57) ABSTRACT

The invention relates to a thin sheet metal for a reinforcing or structural part of a car body, consisting of an aluminum alloy. The invention also relates to the method for producing such a sheet metal and to the use of such a sheet metal for producing a reinforcing or structural part for a car body. The sheet metals according to the invention advantageously have a modulus of elasticity of at least 77 GPa.

19 Claims, 2 Drawing Sheets

(51) Int. Cl.
*C22C 21/02* (2006.01)
*B62D 29/00* (2006.01)

(58) Field of Classification Search
USPC .......................................................... 148/549
See application file for complete search history.

(56) References Cited

U.S. PATENT DOCUMENTS

| | | | |
|---|---|---|---|
| 6,120,623 A | * | 9/2000 | Gupta .................... C22C 21/08 148/552 |
| 6,562,155 B1 | | 5/2003 | Mikubo et al. |
| 2004/0143102 A1 | | 7/2004 | Hock et al. |
| 2014/0140886 A1 | | 5/2014 | Speckert et al. |

FOREIGN PATENT DOCUMENTS

| | | | |
|---|---|---|---|
| EP | 0790325 A1 | | 8/1997 |
| JP | 59126747 A | | 7/1984 |
| JP | S59157254 A | | 9/1984 |
| JP | 2009263720 A | * | 11/2009 |
| JP | 2009263720 A | | 11/2009 |
| WO | 95/34691 A1 | | 12/1995 |
| WO | 2012/043030 A1 | | 4/2012 |

OTHER PUBLICATIONS

JP-2009263720-A Translation (Year: 2009).*
R. N. Lumley et al. Heat Treatment of High-Pressure Die Castings, The Minerals, Metals & Materials Society and ASM International, 2007 (Year: 2007).*
Search Report of French Patent Application No. 1561647 dated Jul. 29, 2016.
English translation of an excerpt from The Basic Theory and Process of Casting Formation, pp. 270-271 (1994).
English translation of an excerpt from Cast Alloy Phase Diagrams, (Nov. 1980) p. 131.
International Search Report of International Patent Application No. PCT/FR2016/052878 dated Feb. 8, 2017.

* cited by examiner

HIGHLY RIGID SHEET FOR CAR BODY

CROSS-REFERENCE TO RELATED APPLICATIONS

This application is a National Stage entry of International Application No. PCT/FR2016/052878, filed 7 Nov. 2016, which claims priority to French Patent Application No. 1655564, filed 15 Jun. 2016, and French Patent Application No. 1561647, filed 1 Dec. 2015.

BACKGROUND

Field

Domain of the Invention

The invention relates to the domain of aluminium alloy sheets to be used for the manufacture of inner, structural or reinforcing parts of the body-in-white of cars, by stamping.

Description of Related Art

Aluminium alloys are increasingly used in the manufacture of automobile vehicles because their use can reduce the weight of vehicles and thus reduce fuel consumption and emissions of greenhouse gases.

Aluminium alloy sheets are currently used for the manufacture of many "body-in-white" parts including bodywork skin parts (or external bodywork panels) such as front wings, the hood, trunk and door skins, inner parts for example such as door, wing, trunk lid and hood inner parts; and finally structural parts for example spars, firewalls, load bearing floors and front, middle and rear pillars.

Although many skin parts are already made from aluminium alloy sheets, the transposition from steel to aluminium for reinforcing parts and particularly for inner or structural parts, with higher characteristics is more difficult, firstly because aluminium alloys are less formable than steels and secondly because the mechanical properties are generally lower than the properties of steels used for this type of part.

For reinforcing or structural type applications, a set of sometimes antagonistic properties are required, such as:

high formability in the delivery temper (T4), particularly for stamping operations, a controlled yield stress in the delivery temper of the sheet to control elastic springback when forming, high mechanical strength after annealing and/or after cataphoresis and paint bake to obtain good mechanical strength in service while minimising the weight of the part, a good capacity for absorption of energy in case of impact for application to structural body parts, good behaviour in the various assembly processes used in automobile bodywork such as spot welding, laser welding, bonding, clinching or riveting, good resistance to corrosion, particularly intergranular corrosion, stress corrosion and filiform corrosion of the finished part, compatibility with recycling requirements for fabrication waste or waste from recycled vehicles, an acceptable cost for production in large series.

However, one important property has often been neglected, namely the rigidity of the alloy that is related to its modulus of elasticity. Thus, a material for which the modulus of elasticity (sometimes also called Young's modulus) is very high, is said to be rigid. Thus when the material is rigid, it may be possible to reduce the thickness of a part making it thinner than parts currently used, and thus save weight, for some parts for which this is a limiting factor. This type of part is used essentially for reinforcing or structural parts.

Patent application WO 95/34691 relates to an aluminium alloy sheet that will be used for mechanical, aeronautical or spatial construction characterised by the composition (weight %) Si 6.5-11%, Mg 0.5-1.0%, Cu<0.8%, Fe<0.3%, Mn<0.5%, and/or Cr<0.5%, Sr 0.008-0.025%, Ti<0.02%, total of other elements <0.2%, remainder aluminium. Sheets according to this patent application have a high modulus of elasticity and low density and can be used particularly for the lower wing skin of wings and aircraft fuselage skins, and for cryogenic tanks for rockets.

Patent U.S. Pat. No. 4,126,486 describes the fabrication of AlSi alloy sheets containing 4 to 15% of Si by direct casting between two cooled cylinders. The thickness of the strips obtained is reduced by at least 60% by cold rolling and are then heat treated at a temperature between 250 and 400° C. These sheets are used for applications for which low mechanical strengths are acceptable.

Patent EP 0 790 325 describes extruded products for turning with composition (weight %) Si 11-13.5%, Mg 0.5-2.0%, Cu<0.35%, Fe<1.0%, Mn<1.2%, Cr<0.1%, Sr0.02-0.1%, Zr<0.1%, Ni<0.1%, Zn<0.1%, Bi<1.0%, Pb<1.0%, Sn<1.0%, Ti<0.02%, with the remainder being aluminium and inevitable impurities.

In particular, patent application US 2004/0143102 describes an aluminium alloy containing Si 0.3-12.5%, Mg 0.1-6%, Cu 0.01-1%, Sr 0.001-0.5%, Zn 0.01-3% with the remainder being aluminium and inevitable impurities.

SUMMARY

The purpose of this invention is to provide aluminium alloy sheets for car body reinforcing or structural parts with high rigidity, while other characteristics are acceptable: mechanical strength in service, after forming and paint bake, as high as sheets according to prior art, good resistance to corrosion, particularly intergranular or filiform corrosion, satisfactory formability by stamping at ambient temperature and good behaviour in the various assembly processes such as spot welding, laser welding, bonding, clinching or riveting.

The purpose of the invention is a thin sheet for a reinforcing or structural part of a car body, consisting of an aluminium alloy with the following composition, in weight %:

Si: 10-14,
Mg: 0.05-0.8,
Cu: 0-0.2,
Fe: 0-0.5,
Mn: 0-0.5,
optionally at least one element selected from Na, Ca, Sr, Ba, Y and LL the quantity of said element if selected being between 0.01 and 0.05 for Na, Ca, Sr, Ba and Y and between 0.1 and 0.3 for Li,
Sb: 0-0.05,
Cr: 0-0.1,
Ti: 0-0.2,
other elements <0.05 each and <0.15 total, remainder aluminium, Another purpose is a method of manufacturing thin sheets according to the invention comprising the following steps in sequence:

the typically semi-continuous vertical casting of a slab with a composition according to the invention and optionally scalping, optionally homogenisation, heating to a temperature of between 400 and 560° C.

hot rolling of the slab into a strip between 2 and 12 mm thick, optionally, cold rolling to the final thickness, optionally, solution heat treatment of the sheet at between 500 and 560° C. for between 1 second and 5 minutes, following by cooling to a temperature below 200° C., optionally, a heat treatment at a temperature between 40 and 150° C. for a duration of 1 to 15 hours, ageing at ambient temperature for at least 3 days.

Another subject of the invention is the use of a thin sheet according to the invention to make a reinforcing or structural part of a car body.

BRIEF DESCRIPTION OF THE DRAWINGS

FIG. 1 shows the structure obtained after casting of ingots 1 and 2 in example 1 (FIGS. 1a and 1b respectively).

DETAILED DESCRIPTION OF A PREFERRED EMBODIMENT

Unless mentioned otherwise, all indications about the chemical composition of alloys are expressed as a percent by weight based on the total weight of the alloy. The expression 1.4 Cu means that the copper content expressed as a weight % is multiplied by 1.4. Alloys are designated in accordance with the rules of the Aluminum Association, known to one skilled in the art. The definitions of the metallurgical tempers are indicated in European standard EN 515.

Static mechanical properties in tension, in other words the ultimate strength Rm, the conventional yield stress at 0.2% elongation Rp 0.2, elongation at necking Ag % and elongation at rupture A %, are determined by a tensile test according to standard NF EN ISO 6892-1, sampling and the direction of the test being defined by standard EN 485-1. The plastic anisotropy coefficient is determined according to standard ISO 10113. The tensile strain hardening coefficient is determined according to standard ISO 10275.

The limiting forming curve is determined according to standard ASTM E2218.

The modulus of elasticity is measured according to standard ASTM 1876.

Unless mentioned otherwise, the definitions in standard EN 12258 are applicable. A thin sheet is a rolled sheet with a rectangular cross-section and with a uniform thickness of between 0.20 mm and 6 mm.

According to the invention, thin aluminium alloy sheets containing 10 to 14 weight % of silicon and 0.05-0.8 weight % of magnesium have a significantly higher rigidity than sheets made of a 5xxx or 6xxx alloy traditionally used to make reinforcing or structural car body parts and therefore make it possible to reduce the thickness of these parts when rigidity is a limiting factor. Thus, products according to the invention typically have a modulus of elasticity equal to at least 77 GPa while the modulus of products for reinforcing or structural car body parts according to prior art is typically between 67 and 72 GPa.

Surprisingly, it was possible to obtain sheets for which the modulus is higher than for sheets according to prior art while obtaining satisfactory characteristics for antagonistic properties such as formability or corrosion.

The silicon content must be at least 10% and preferably 11 weight %, since a sufficient modulus of elasticity cannot be obtained with a lower content. Advantageously, the silicon content is at least 11.5 weight % and preferably at least 12 weight %. The silicon content must be not more than 14%, since the required elongation and formability properties cannot be obtained with a higher content. Advantageously, the silicon content is not more than 13.5 weight % and preferably not more than 13 weight %.

The magnesium content must be at least 0.05 weight % and preferably at least 0.1 weight %, since sufficient mechanical properties cannot be obtained with a lower content. The magnesium content must be not more than 0.8 weight % and preferably not more than 0.7%, since the required elongation and formability properties cannot be obtained with a higher content. In one embodiment of the invention, the magnesium content is between 0.1 and 0.3 weight %, which can give good formability of the sheet. The use of sheets according to this embodiment to make reinforcing sheets, particularly inner sheets for example such as door, wing, rear door or hood inner parts, is advantageous.

In another embodiment of the invention, the magnesium content is between 0.3 and 0.6 weight %, which can give higher mechanical strength while maintaining sufficient formability. The use of sheets according to this embodiment to make structural parts, for example such as spars, firewalls, load resisting floors and front, middle and rear pillars is advantageous.

The copper content is between 0 and 0.2 weight %. A copper content of more than 0.2 weight % has a negative influence on the resistance to corrosion. It is advantageous to add a quantity of copper equal to between 0.03 and 0.15 weight % particularly to improve the formability of sheets after ageing (for example the T4 temper) and/or the mechanical strength after final heat treatment of the parts (for example T6 or T7 temper).

The iron content is between 0 and 0.5 weight %. An iron content of more than 0.5 weight % has a negative influence on formability. Advantageously, an iron quantity of between 0.1 and 0.3 weight % is added to improve mechanical strength and formability. It may be advantageous to add an iron quantity of between 0.05 and 0.2 weight %, particular to improve formability, and particularly for making inner parts.

The manganese content is between 0 and 0.5 weight %. A manganese content of more than 0.5 weight % has a negative influence on formability. In one embodiment, it is advantageous to add a quantity of manganese equal to between 0.05 and 0.2 weight %, particularly to improve formability. However, in another embodiment, no manganese is added and the manganese content is less than 0.05 weight %.

The addition of at least one element selected from among Na, Ca, Sr, Ba, Y and Li, the quantity of said element if selected being equal to 0.01-0.05 for Na, Ca, Sr, Ba and Y and equal to 0.1-0.3 for Li, is advantageous. if the element is not chosen as an additive, its content is maintained at less than 0.01 weight % for Na, Ca, Sr, Ba, Y and less than 0.05 weight % for Li. These elements are modifying elements that in particular help to control the size of eutectic components containing silicon during solidification and/or modify their structure, which has a positive influence on mechanical properties, particularly on formability, and particularly when casting large sheets. Strontium is the preferred modifying agent and the addition of 0.01 to 0.05 weight % of strontium is advantageous.

The addition of antimony is advantageous particularly to limit the presence of phosphorus in the alloy, this element having a negative influence on the structure of the eutectic. In one embodiment of the invention, the antimony content is between 0.01 and 0.04 weight %, however in this embodiment the addition of a modifying agent such as sodium or strontium is preferably avoided.

The chromium content is between 0 and 0.5 weight %. In one embodiment, the added chromium quantity is between 0.1 and 0.3 weight %.

The titanium content is between 0 and 0.2 weight %. Advantageously, a titanium quantity of between 0.01 and 0.15 weight % is added. In one advantageous embodiment, the Cr and Ti contents are such that Cr: 0.01-0.05 weight % and/or Ti 0.01-0.15 weight %.

The method of fabricating sheets according to the invention comprises casting of a slab, typically by semi-continuous vertical casting, with a composition according to the invention, and optionally scalping.

Optionally, the slab thus obtained can be homogenised, however homogenisation might not be advantageous and it is usually preferred to heat directly to a temperature of between 400 and 560° C., advantageously holding between 30 minutes and 6 hours. The next step is hot rolling of the slab into a strip between 2 and 12 mm thick and then optionally cold rolling to obtain a thin sheet. Preferably, the temperature at the start of hot rolling is between 400 and 550° C. In one advantageous embodiment of the invention, the start temperature of hot rolling is between 500 and 540° C. The end temperature of hot rolling is preferably between 200 and 250° C. In one advantageous embodiment of the invention, the end temperature of hot rolling is between 210 and 240° C. The present inventors have observed that rolling outside these preferred temperatures can lead to a significant reduction in mechanical properties. Preferably, the method includes a cold rolling step.

Solution heat treatment of the thin sheet thus obtained at a temperature of between 500 and 560° C. for 1 second to 5 minutes is advantageous. The temperature is advantageously higher than the solvus temperature of the alloy and is less than incipient melting. The thin sheet is then cooled to a temperature below 200° C. and preferably below 100° C. Preferably, cooling is fast, the cooling rate between more than 10° C./s and even better at least 20° C./s.

Optionally, the thin sheet is then heat treated at a temperature between 40 and 150° C. and preferably between 50 and 100° C. for a duration of 1 to 15 hours, this treatment in particular being done while cooling the coil obtained.

The thin sheet is then cooled for at least three days, typically so as to obtain a T4 temper.

The modulus of elasticity of the sheets according to the invention measured according to standard ASTM 1876 is advantageously equal to at least 77 GPa and preferably at least 79 GPa and the sheets have at least one among the following characteristics, and preferably all of the following characteristics:

A yield stress between 90 and preferably 130 and 200 MPa, and even more preferably between 140 et 190 MPa An elongation at rupture A% equal to at least 15% and preferably at least 18%.

An elongation at necking Ag% equal to at least 13% and preferably at least 15%.

Preferably, the plastic anistropy coefficient of the thin sheets according to the invention at 10% the plastic strain $r_{10}$ determined according to standard ISO 10113 is equal to at least 0.55 and preferably at least 0.60. These mechanical properties were advantageously obtained regardless of the measurement direction and typically at least in the direction perpendicular to rolling.

In the embodiment according to the invention in which the magnesium content is between 0.1 and 0.3 weight % such that a high formability of the sheet can be obtained, the modulus of elasticity of the sheets obtained by the method according to the invention measured according to ASTM standard 1876 is advantageously at least 77 GPa and preferably at least 78 GPa and they have at least one of the following characteristics, and preferably all of the following characteristics:

A yield stress between 80 and 150 MPa, and preferably between 90 et 130 MPa

An elongation at rupture A % equal to at least 18% and preferably at least 20%.

An elongation at necking Ag % equal to at least 15% and preferably at least 17%.

Advantageously, the sheets according to the embodiment in which the magnesium content is between 0.1 and 0.3% have at least one among the following characteristics, and preferably all of the following characteristics:

A plastic anistropy coefficient at 10% plastic strain $r_{10}$ determined according to ISO standard 10113 equal to at least 0.60 and preferably at least 0.70.

A strain hardening coefficient in tension for a strain of 5% $n_5$ determined according to ISO standard 10275 equal to at least 0.26, A minimum value of the major strain in a limiting forming curve determined according to ASTM standard E2218 equal to at least 18% and preferably at least 19%.

These mechanical properties were advantageously obtained regardless of the measurement direction and typically at least in the direction perpendicular to rolling. The present inventors have observed that in the embodiment in which the magnesium content is between 0.1 and 0.3%, the mechanical properties are particularly isotropic, particularly the average value of the plastic anistropy coefficient at 10% $<r_{10}>=(r_{10}(L)+2\times r_{10}(45)+r_{10}(TC))/4$, in which $r_{10}(L)$ is measured in the rolling direction, $r_{10}(45)$ is measured at 45° from the rolling direction and $r_{10}(TC)$ is measured at 90° from the rolling direction, is at least 0.60 and preferably at least 0.70.

In the embodiment according to the invention in which the magnesium content is between 0.3 and 0.6 weight % such that a higher mechanical strength can be obtained while maintaining sufficient formability, the modulus of elasticity of the sheets obtained by the method according to the invention measured according to standard ASTM 1876 is advantageously at least 77 GPa and preferably at least 79 GPa and they have at least one of the following characteristics, and preferably all of the following characteristics:

A yield stress between 130 and 200 MPa, and preferably between 140 et 190 MPa

An elongation at rupture A% equal to at least 15% and preferably at least 18%.

An elongation at necking Ag% equal to at least 13% and preferably at least 15%.

Advantageously, the value of LDH as defined in example 2 and measured on a 3.5 mm thick sheet according to the invention is at least 20 mm and preferably at least 24 mm and even more preferably at least 27 mm.

Thus, the modulus of elasticity of sheets according to the invention is high and their formability at ambient temperature is satisfactory. Also advantageously, after forming, assembly, annealing and/or paint bake, they have high mechanical properties and good resistance to corrosion and particularly intergranular corrosion in service.

The maximum intergranular corrosion depth of thin sheets according to the invention in the naturally aged annealed temper and/or after paint bake, measured according to ISO standard 11846 is advantageously less than 300 μm, preferably less than 250 μm and even more preferably less than 200 μm.

The distribution of silicon particles in the microstructure of thin sheets according to the invention is homogeneous and no particle clumps are observed. Advantageously, the ratio of the surface covered by silicon particles as observed on an L-TC section with a magnification of ×500 in the as-polished state is at least 8%, preferably at least 9% and even more preferably at least 10%.

According to the invention, a thin sheet according to the invention can be used to make a reinforcing or structural part of a car body.

Advantageously, in the use according to the invention, the thin sheet is obtained by the method according to the invention and is then typically formed by stamping, folding and/or rolling and an annealing heat treatment is then performed, this heat treatment possibly being done at the same time as the paint is baked.

The yield stress of reinforcing or structural car body parts for use according to the invention in service, in other words during use in a car body, is advantageously at least 220 MPa, preferably at least 250 MPa, and their elongation at rupture is at least 6% and preferably at least 10%.

The maximum intergranular corrosion depth of reinforcing or structural car body parts for use according to the invention measured according to ISO standard 11846 is advantageously less than 300 μm and preferably less than 200 μm.

EXAMPLES

Example 1

50 mm thick ingots were cast. Table 1 shows the composition of the ingots.

TABLE 1

| composition of ingots in weight % | | | | | | | |
|---|---|---|---|---|---|---|---|
| No | Si | Fe | Cu | Mn | Mg | Cr | Ti | Sr |
| 1 | 11.3 | 0.26 | <0.01 | 0.10 | 0.50 | 0.05 | 0.05 | |
| 2 | 11.2 | 0.26 | <0.01 | 0.10 | 0.52 | 0.05 | 0.05 | 0.03 |
| 3 | 12.8 | 0.28 | <0.01 | 0.11 | 0.58 | 0.05 | 0.05 | 0.03 |
| 4 | 15.0 | 0.25 | <0.01 | 0.10 | 0.52 | 0.05 | 0.01 | |

The ingots were heated to 540° C. for two hours and were then hot rolled to a thickness of 9 mm and were then cold rolled to a thickness of 3.5 mm. The thin sheets thus obtained were solution heat treated at 540° C. for one minute and then quenched. A heat treatment was then done for 8 hours at a temperature of 85° C. The sheets were then aged at ambient temperature to obtain a T4 temper. A two-hour annealing heat treatment at 210° C. was also carried out on some sheets.

Figures 1, 1A:
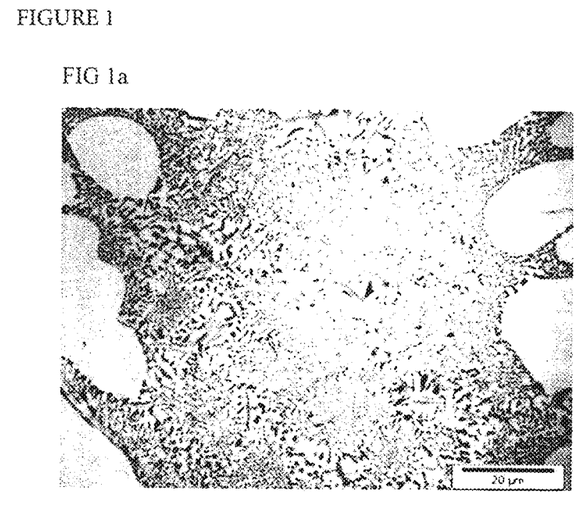
Figure 1B:
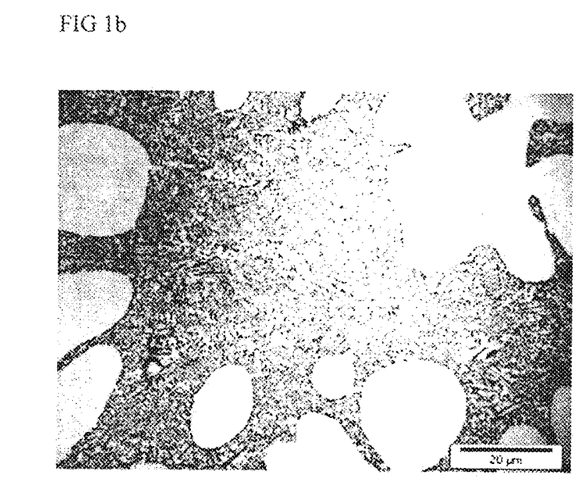

The cast structures were then observed by optical microscopy. FIG. 1a shows the structure obtained for alloy 1 and FIG. 1B shows the structure obtained for alloy 2. The addition of strontium reduces the size of eutectic compounds that appear in black, which is advantageous.

The mechanical characteristics were measured according to standards NF EN ISO 6892-1, EN 485-1 and ASTM 1876 along the direction perpendicular to the rolling direction. The dimensions of the samples for measurement of the modulus E were 60×10×3 mm.

The results of the characterisations are given in Table 2.

TABLE 2

| Mechanical properties of thin sheets | | | | | | | | | |
|---|---|---|---|---|---|---|---|---|---|
| | T4 | | | | | Annealed 2 h-210° C. | | | |
| | E (GPa) | $R_{p0.2}$ (MPa) | $R_m$ (MPa) | Ag % | A % | E (GPa) | Y.S. MPa | UTS (MPa) | Ag % | A % |
| 1 | 78.3 | 157 | 283 | 14.2 | 16.2 | 79.1 | 258 | 306 | 5.0 | 8.4 |
| 2 | 77.8 | 158 | 283 | 14.2 | 16.9 | 79.2 | 256 | 304 | 5.4 | 9.6 |
| 3 | 78.2 | 160 | 291 | 14.5 | 15.9 | 80.5 | 260 | 307 | 4.7 | |
| 4 | 80.8 | 154 | 269 | 8.3 | 8.3 | 81.6 | 238 | 287 | 4.5 | 4.8 |

Alloy 4 that is not included in the invention does not have sufficient elongation.

Example 2

50 mm thick ingots were cast. Table 3 shows the composition of the ingots.

TABLE 3,

| composition of ingots in weight % | | | | | | | |
|---|---|---|---|---|---|---|---|
| | Si | Fe | Cu | Mn | Mg | Cr | Ti | Sr |
| A | 12.6 | 0.26 | 0.00 | 0.11 | 0.56 | 0.02 | 0.05 | 0.03 |
| B | 12.7 | 0.25 | 0.03 | 0.10 | 0.58 | 0.02 | 0.05 | 0.04 |
| C | 12.9 | 0.27 | 0.10 | 0.11 | 0.55 | 0.02 | 0.05 | 0.03 |
| D | 12.6 | 0.27 | 0.00 | 0.11 | 0.36 | 0.02 | 0.05 | 0.04 |
| E | 12.6 | 0.10 | 0.00 | 0.10 | 0.58 | 0.02 | 0.05 | 0.04 |
| F | 12.8 | 0.20 | 0.04 | 0.10 | 0.59 | 0.02 | 0.05 | 0.04 |
| H | 12.9 | 0.27 | 0.10 | 0.11 | 0.55 | 0.02 | 0.05 | 0.03 |
| I | 12.9 | 0.27 | 0.10 | 0.11 | 0.55 | 0.02 | 0.05 | 0.03 |

Ingots A to F were heating to 540° C. for two hours and then hot rolled to a thickness of 9 mm with a hot rolling start temperature between 518 and 524° C. and a hot rolling end temperature between 218 and 233° C., then cold rolled to a thickness of 3.5 mm. Ingot H was heated to 460° C. for two hours and then hot rolled to a thickness of 9 mm with a hot rolling start temperature of 451° C. and a hot rolling end temperature of 201° C., then cold rolled to a thickness of 3.5 mm. Ingot I was heated to 500° C. for two hours and then hot rolled to a thickness of 9 mm with a hot rolling start temperature of 488° C. and a hot rolling end temperature of 296° C., then cold rolled to a thickness of 3.5 mm. The thin sheets thus obtained were solution heat treated at 540° C. for one minute and then quenched. A heat treatment was then done for 8 hours at a temperature of 85° C. The sheets were then aged at ambient temperature to obtain a T4 temper. An annealing heat treatment for two hours at 210° C. was also carried out on some sheets. A 20-minute heat treatment at 185° C. preceded by 2% pre-strain was also done on other sheets to simulate baking of car paint.

The mechanical characteristics were measured according to standards NF EN ISO 6892-1, EN 485-1 and ASTM 1876 along the direction perpendicular to the rolling direction. The dimensions of samples used to measure the modulus E were 60×10×3 mm. The coefficient of plastic anisotropy at 10% plastic strain $r_{10}$ was determined according to ISO standard 10113.

Furthermore, the forming performance of sheets in the T4 temper was evaluated using the LDH (Limit Dome Height) test.

The LDH parameter is widely used to evaluate the formability of sheets. There have been many publications on this subject, and particularly that by Thompson, "The LDH test to evaluate sheet metal formability—Final Report of the LDH Committee of the North American Deep Drawing Research Group", SAE conference, Detroit, 1993, SAE Paper No. 930815.

This is a stamping test of a blank fixed around its periphery by a binder frame. The clamping pressure is controlled to prevent sliding in the frame. The blank, with dimensions 120×160 mm, is loaded in a manner similar to plane strain. The punch used is hemispherical.

Figure 2:
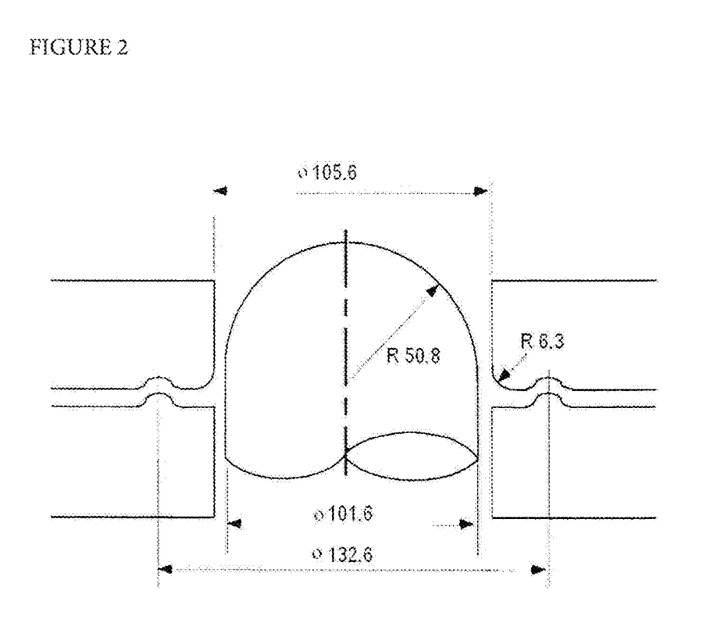
FIG. 2 specifies the dimensions in mm of the tools used to determine the value of the parameter known to one skilled in the art as LDH (Limit Dome Height) characteristic of the formability of the material.

FIG. 2 shows the dimensions of tools used to perform this test.

Graphite grease (Shell HDM2 grease) is used for lubrication between the punch and the sheet. The punch lowering rate is 50 mm/min. The value referred to as the LDH value is the displacement value of the punch at failure, which is the limiting stamping depth. It is the average of three tests, giving a confidence interval of 95% on the 0.2 mm measurement.

120×160 mm test pieces were used, with the 160 mm dimension being placed perpendicular to the rolling direction.

The results of the characterisations are given in Table 4.

a drying oven), after pickling with hot soda (5% by mass) and nitric acid (70% by mass) at ambient temperature. The type and depth of the resulting corrosion are determined by an examination of the micrographic section of the metal. The average corrosion depth and the maximum corrosion depth were measured.

TABLE 5

Results of intergranular corrosion tests

| | T4 | | Annealed 2 h-210° C. | |
|---|---|---|---|---|
| | Average corrosion depth (μm) | Maximum corrosion depth (μm) | Average corrosion depth (μm) | Maximum corrosion depth (μm) |
| A | 5 | 32 | 25 | 42 |
| B | 11 | 27 | 46 | 141 |
| C | 27 | 204 | 84 | 186 |
| D | 25 | 207 | 25 | 91 |
| E | 5 | 17 | 21 | 55 |
| F | 28 | 186 | 40 | 112 |
| H | 38 | 251 | 118 | 169 |
| I | 46 | 177 | 86 | 145 |

Example 3

A 420 mm thick ingot was cast. Table 6 shows the composition of the ingot.

TABLE 6 composition of ingots in weight %

| | Si | Fe | Cu | Mn | Mg | Cr | Ti | Sr |
|---|---|---|---|---|---|---|---|---|
| J | 12.4 | 0.15 | 0.09 | 0.10 | 0.14 | 0.02 | 0.03 | 0.03 |

The ingot J was heated to 540° C. for more than an hour and was then hot rolled to a thickness of 6.1 mm and then cold rolled to a thickness of 1.5 mm. The thin sheets thus obtained were solution heat treated at 540° C. and then

TABLE 4

Mechanical properties of thin sheets

| | T4 | | | | | | | Annealed 2 h at 210° C. | | | | | | Simulation of paint baking | | | |
|---|---|---|---|---|---|---|---|---|---|---|---|---|---|---|---|---|---|
| | E (GPa) | $R_{p0.2}$ (MPa) | $R_m$ (MPa) | Ag % | A % | $r_{10}$ | LDH (mm) | E (GPa) | $R_{p0.2}$ (MPa) | $R_m$ (MPa) | Ag % | A % | $R_{p0.2}$ (MPa) | $R_m$ (MPa) | Ag % | A % |
| A | 78.0 | 173 | 309 | 15.2 | 16.9 | 0.66 | 24.3 | 79.3 | 265 | 312 | 4.8 | 8.8 | 300 | 348 | 8.6 | 12.1 |
| B | 78.7 | 174 | 302 | 15.0 | 18.1 | 0.67 | 25.7 | 79.6 | 272 | 319 | 4.6 | 6.7 | 289 | 342 | 9.3 | 12.4 |
| C | 77.7 | 181 | 317 | 15.1 | 18.9 | 0.68 | 27.1 | 80.7 | 285 | 333 | 4.8 | 8.1 | 306 | 355 | 9.0 | 12.8 |
| D | 79.1 | 155 | 282 | 16.3 | 20.1 | 0.66 | 28.0 | 79.6 | 239 | 291 | 5.9 | 10.2 | 268 | 325 | 9.3 | 13.4 |
| E | 78.9 | 178 | 306 | 14.9 | 18.2 | 0.68 | 27.0 | 79.9 | 280 | 323 | 4.7 | 7.8 | 308 | 353 | 8.0 | 10.4 |
| F | 80.6 | 187 | 318 | 13.8 | 16.1 | 0.71 | 24.1 | 80.5 | 283 | 327 | 4.2 | 6.7 | 302 | 350 | 8.3 | 10.3 |
| H | 78.9 | 179 | 314 | 14.2 | 17.1 | 0.64 | 26.4 | 79.2 | 272 | 326 | 4.6 | 6.8 | 312 | 358 | 7.8 | 10.8 |
| I | 79.1 | 173 | 309 | 15.2 | 16.9 | 0.64 | 25.2 | 80.5 | 265 | 312 | 4.8 | 8.8 | 300 | 348 | 8.6 | 12.1 |

Alloy D has a particularly advantageous formability.

Intergranular corrosion resistance properties were measured according to ISO standard 11846. In particular, the average depth and the maximum depth of intergranular corrosion were evaluated. The results are given in Table 5. The intergranular corrosion test according to ISO standard 11846 consists of immersing tests pieces for 24 h in a solution of sodium chloride (30 g/l) and hydrochloric acid (10 ml/l) at a temperature of 30° C. (obtained by holding in quenched. The sheets were than aged at ambient temperature to obtain a T4 temper. A 20-minute heat treatment at 185° C. preceded by 2% pre-strain was also done on some sheets to simulate baking of car paint.

The mechanical characteristics were measured according to standards NF EN ISO 6892-1, EN 485-1 and ASTM 1876 along the direction perpendicular to the rolling direction. The dimensions of samples used to measure the modulus E were 60×20×1.5 mm. The coefficient of plastic anisotropy at 10% plastic strain $r_{10}$ was determined according to ISO standard 10113. The tensile strain hardening coefficient for a strain of 5% $n_5$ was determined according to ISO standard 10275. Furthermore, the stamping performance of sheets in the T4 temper was evaluated using the LDH (Limit Dome Height) test as described for the previous example. Finally, the limiting forming curve was determined according to ASTM standard E2218.

The results of the characterisations are given in Table 7.

TABLE 7

| Mechanical properties of thin sheets made of alloy J | | | | | | | | | | | | | |
|---|---|---|---|---|---|---|---|---|---|---|---|---|---|
| | T4 | | | | | | | | Simulation of paint baking | | | | |
| Orientation | E (GPa) | $R_{p0.2}$ (MPa) | $R_m$ (MPa) | Ag % | A % | $r_{10}$ | $n_s$ | LDH (mm) | E (GPa) | $R_{p0.2}$ (MPa) | $R_a$ (MPa) | Ag % | A % |
| L | 78.5 | 101 | 217 | 18.8 | 22.0 | 0.74 | 0.26 | 26.9 | 78.7 | | | | |
| 45° | | 97 | 212 | 19.6 | 22.7 | 0.79 | 0.26 | | | | | | |
| TC | | 99 | 217 | 17.9 | 21.5 | 0.72 | 0.26 | 25.9 | | 166 | 234 | 12.3 | 14.7 |

Figure 3:
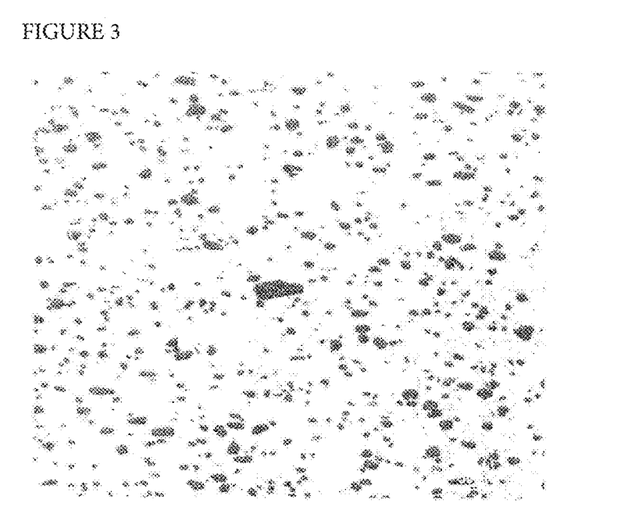
FIG. 3 shows the limiting forming curve measured according to ASTM standard E2218 for the sheet according to example 3.

The limiting forming curve is shown on FIG. 3. The minimum value of the major strain was 19%.

Alloy J has a particularly advantageous formability.

The plate according to the invention made of alloy J was characterised by optical microscopy on an L-TC section with ×500 magnification in the as-polished state.

The micrograph obtained is shown on FIG. 4. The distribution of silicon particles is homogeneous and no particle agglomerates are observed. A statistical analysis of the size and distribution of silicon particles was made on 60 measurement fields for an analysed surface area of 3.4 mm². The fraction of silicon particles on the surface was 9.7%. The fraction of silicon particles on the surface of the sheet according to the invention was 9%. For a higher silicon content, an even higher fraction of silicon particles on the surface would be obtained.

The invention claimed is:

1. A sheet for a reinforcing or structural part of a car body, comprising an aluminium alloy of the following composition, in weight percent:
   Si: 10-14,
   Mg: 0.05-0.8,
   Cu: 0-0.2,
   Fe: 0-0.5,
   Mn: 0-0.5,
   optionally at least one element selected from Na, Ca, Sr, Ba, Y and Li, the quantity of said element if selected being between 0.01 and 0.05 for Na, Ca, Sr, Ba and Y and between 0.1 and 0.3 for Li,
   Sb: 0-0.05,
   Cr: 0-0.1,
   Ti: 0-0.2,
   other elements <0.05 each and <0.15 total, remainder aluminium;
   wherein the sheet is a rolled sheet; and
   wherein the sheet is in T4 temper, has a modulus of elasticity measured according to standard ASTM 1876 equal to at least 77 GPa, and has the following characteristics:
   a yield stress between 90 and 200 MPa,
   an elongation at rupture A % equal to at least 15%,
   an elongation at necking Ag % equal to at least 13%, and
   a value of Limit Dome Height (LDH) measured on the sheet when 3.5 mm thick is at least 20 mm.

2. The sheet according to claim 1, wherein Si: 11.5-13 weight %.

3. The sheet according to either claim 1, wherein Cu: 0.03-0.15 weight %.

4. The sheet according to claim 1, wherein Fe: 0.1-0.3 weight %.

5. The sheet according to claim 1, wherein Mn: 0.05-0.2 weight %.

6. The sheet according to claim 1, wherein Mn: <0.05 weight %.

7. The sheet according to claim 1, wherein Sr is present and between 0.01-0.05 weight %.

8. The sheet according to claim 1, wherein Cr: 0.01-0.05 weight % and/or Ti 0.01-0.15 by weight %.

9. The sheet according to claim 1, for which the magnesium content is between 0.3 and 0.6 by weight %, wherein the sheet further has the following characteristic:
   a yield stress between 130 and 200 MPa.

10. The sheet according to claim 9,
    wherein the modulus of elasticity is at least 79 GPa;
    wherein the yield stress is between 140 and 190 MPa;
    wherein the elongation at rupture A % is at least 18%; and
    wherein the elongation at necking Ag % is at least 15%.

11. The sheet according to claim 1, for which the magnesium content is between 0.1 and 0.3 weight %, wherein the sheet has at least one of the following characteristics:
    an elongation at rupture A % equal to at least 18%
    an elongation at necking Ag % equal to at least 15%; and
    wherein the sheet has a yield stress between 90 and 150 MPa.

12. The sheet according to claim 11, wherein the modulus of elasticity is at least 78 GPa;
    wherein the yield stress is between 90 and 130 MPa;
    wherein the elongation at rupture A % is at least 20%; and
    wherein the elongation at necking Ag % is at least 17%.

13. The sheet according to claim 1, in which the ratio of the surface covered by silicon particles observed on an L-TC section with a magnification of ×500 in the as-polished state is at least 8%.

14. The sheet according to claim 13, wherein the ratio of the surface covered by silicon particles observed on an L-TC section with a magnification of ×500 in the as-polished state is at least 9%.

15. The sheet according to claim 1 to make a reinforcing or structural part of a car body.

16. The sheet according to claim 15 in which said car body reinforcing or structural part has a yield stress in service of at least 220 MPa and an elongation at rupture of at least 6%.

17. The sheet according to claim 16 in which said car body reinforcing or structural part has a yield stress in service of at least 250 MPa and an elongation at rupture of at least 10%.

18. A method of manufacturing the sheet according to claim 1 comprising successively:
- typically semi-continuous vertical casting of a slab with said composition and optionally scalping,
- optionally homogenizing the slab,
- heating the slab to a temperature of between 400 and 560° C.,
- hot rolling of the slab into a strip between 2 and 12 mm thick,
- optionally, cold rolling the strip to a final thickness to form the sheet,
- solution heat treatment of the sheet between 500 and 560° C. for between 1 second and 5 minutes, following by cooling to a temperature below 200° C.,
- optionally, a heat treatment on the sheet at a temperature between 40 and 150° C. for a duration of 1 to 15 hours,
- ageing the sheet at ambient temperature for at least 3 days.

19. A sheet to make a reinforcing or structural part of a car body, in which said sheet is obtained by the method according to claim 18 and is then formed by stamping, folding and/or rolling and an annealing heat treatment is then performed, said annealing heat treatment optionally being done at the same time as paint is baked.

* * * * *